United States Patent
Finley

(10) Patent No.: US 7,234,191 B2
(45) Date of Patent: Jun. 26, 2007

(54) SHOE CLEANING APPARATUS

(76) Inventor: John P Finley, 2689 Robina, Berkley, MI (US) 48072

( * ) Notice: Subject to any disclaimer, the term of this patent is extended or adjusted under 35 U.S.C. 154(b) by 27 days.

(21) Appl. No.: 10/690,887

(22) Filed: Oct. 22, 2003

(65) Prior Publication Data

US 2005/0005384 A1   Jan. 13, 2005

Related U.S. Application Data

(63) Continuation-in-part of application No. 10/640,475, filed on Aug. 13, 2003.

(60) Provisional application No. 60/485,454, filed on Jul. 8, 2003.

(51) Int. Cl.
*A46B 17/02* (2006.01)
*A47L 23/00* (2006.01)

(52) U.S. Cl. .............. 15/161; 15/112; 15/160; 15/237; 224/519; 280/415.1

(58) Field of Classification Search .......... 15/112, 15/146, 159.1, 160, 268, 237, 238, 161; 280/164.2, 280/415.1, 495; 224/519
See application file for complete search history.

(56) References Cited

U.S. PATENT DOCUMENTS

| | | | | |
|---|---|---|---|---|
| 2,857,173 A * | 10/1958 | Benander | .................. | 280/164.2 |
| 3,028,617 A * | 4/1962 | Racina | .................. | 15/160 |
| 3,142,853 A | 8/1964 | Hensley | .................. | 15/161 |
| 3,740,072 A * | 6/1973 | Veith | .................. | 280/164.2 |
| 5,075,917 A | 12/1991 | Wheat et al. | .................. | 15/161 |
| 5,437,075 A | 8/1995 | Peake | .................. | 15/161 |
| 5,479,674 A | 1/1996 | Gilcrest | .................. | 15/161 |
| 6,032,316 A | 3/2000 | Peake et al. | .................. | 15/161 |
| 6,112,360 A | 9/2000 | Kalm et al. | .................. | 15/161 |
| 6,301,739 B1 | 10/2001 | Cazaux | .................. | 15/161 |
| 6,363,567 B1 | 4/2002 | Woodward | .................. | 15/161 |
| 6,478,203 B2 | 11/2002 | Burns | .................. | 224/510 |
| 6,530,105 B1 | 3/2003 | MacDonald | .................. | 15/161 |
| 6,554,171 B1 | 4/2003 | Ewing, III | .................. | 224/521 |

* cited by examiner

*Primary Examiner*—Gladys J P Corcoran
*Assistant Examiner*—Laura C Guidotti
(74) *Attorney, Agent, or Firm*—Harness, Dickey & Pierce, P.L.C.

(57) ABSTRACT

A shoe cleaning apparatus for use with a vehicle includes a brush assembly having at least one brush unit thereon. A mounting arm includes a first end extending from the brush assembly and a second end selectively coupled to a hitch receiver of the vehicle in an installed position. The mounting arm further includes a hinge for moving the brush assembly between an operating position and a storage position. The mounting arm includes an upper portion coupled to the hitch receiver and a lower portion laterally offset from the upper portion toward a ground surface. The lower portion is coupled to the brush assembly. The hinge is disposed on the lower portion of the mounting arm. A stepped portion extends perpendicularly between the upper portion and the lower portion. The brush assembly rotates from a substantially parallel relationship with the ground surface in the operating position to an upright position substantially perpendicular to the ground surface in the storage position.

5 Claims, 6 Drawing Sheets

SHOE CLEANING APPARATUS

CROSS-REFERENCE TO RELATED APPLICATIONS

This application is a continuation-in-part of U.S. patent application Ser. No. 10/640,475 filed on Aug. 13, 2003, which claims the benefit of U.S. Provisional Application No. 60/485,454, filed Jul. 8, 2003. The disclosures of the above applications are incorporated herein by reference.

FIELD OF THE INVENTION

The present invention relates to tread cleaners for shoes and more specifically to a tread cleaning apparatus for use with a vehicle hitch.

BACKGROUND OF THE INVENTION

Shoes are typically provided with a traction consistent to improve grip for a desired surface. For example, cleats are incorporated on outdoor athletic shoes such as soccer, football and track for example. Similarly, golf shoes are provided with spikes or soft spikes for improving a golfers grip with the ground while swinging. A similar strategy is used for construction shoes. A large traction surface is usually provided having deep grooves for negotiating variable terrain.

While these shoes provide improved traction on a given surface, they tend to encourage ground material to become lodged or stuck in the traction detail of the shoe. In this way, grass, mud, dirt, gravel and other debris can build up on the traction over time which can degrade the performance of the shoe and become a nuisance. As a result, it is difficult to keep a vehicle interior clean when using dirty shoes. In particular, in order to prevent the debris from being tracked into a vehicle it is necessary to adequately remove the debris from the shoes or remove the shoes altogether prior to entering the vehicle. Such a requirement can be awkward and inconvenient.

SUMMARY OF THE INVENTION

A shoe cleaning apparatus selectively attachable to a rear of a vehicle having a hitch receiver includes a frame having a forward end including a mounting arm. At least one brush unit is coupled to the frame. A coupling element couples the mounting arm of the frame to the hitch receiver of the vehicle. A hinge is disposed on the mounting arm for moving the brush unit between an operating position and a storage position.

According to other features, the mounting arm includes at least one mounting aperture formed thereon for aligning with an aperture formed on the hitch receiver of the vehicle. The coupling element extends through the hitch receiver aperture and the mounting aperture in an installed position. The frame includes a linking aperture formed on a rearward end thereof. The linking aperture is adapted to cooperate with a tow bar in a towing position for towing a second vehicle. The mounting arm includes a stepped portion for presenting the frame in a laterally offset relationship from the hitch receiver of the vehicle.

A shoe cleaning apparatus for use with a vehicle includes a brush assembly having at least one brush unit thereon. A mounting arm includes a first end extending from the brush assembly and a second end selectively coupled to a hitch receiver of the vehicle in an installed position. The mounting arm further includes a hinge for moving the brush assembly between an operating position and a storage position.

According to other features, the mounting arm includes an upper portion coupled to the hitch receiver and a lower portion laterally offset from the upper portion toward a ground surface. The lower portion is coupled to the brush assembly. The hinge is disposed on the lower portion of the mounting arm. A stepped portion extends perpendicularly between the upper portion and the lower portion. The brush assembly rotates from a substantially parallel relationship with a ground surface in the operating position to an upright position substantially perpendicular to the ground surface in the storage position.

A method of moving a shoe cleaning apparatus between an operating position and a storage position, wherein the shoe cleaning apparatus is attached to a vehicle having a hitch receiving portion includes providing a brush assembly having a brush unit thereon. A mounting aperture on a forward end of the brush assembly is aligned with an aperture formed on the hitch receiving portion of the vehicle. The brush assembly is secured to the hitch receiving portion. The brush assembly is rotated about a hinge disposed on the brush assembly from the operating position substantially parallel to a ground surface to the storage position substantially perpendicular to the ground surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
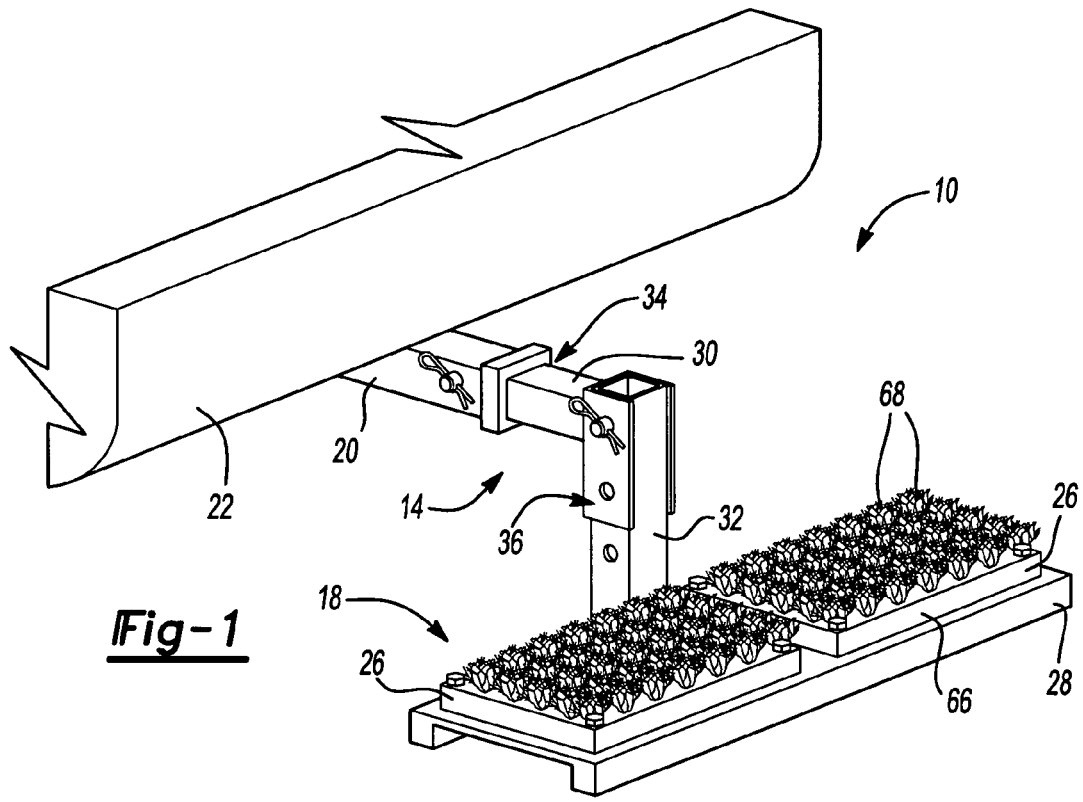
FIG. 1 is a perspective view of the tread cleaner according to a first embodiment shown in an attached position with a vehicle hitch receiver.
Figure 2:
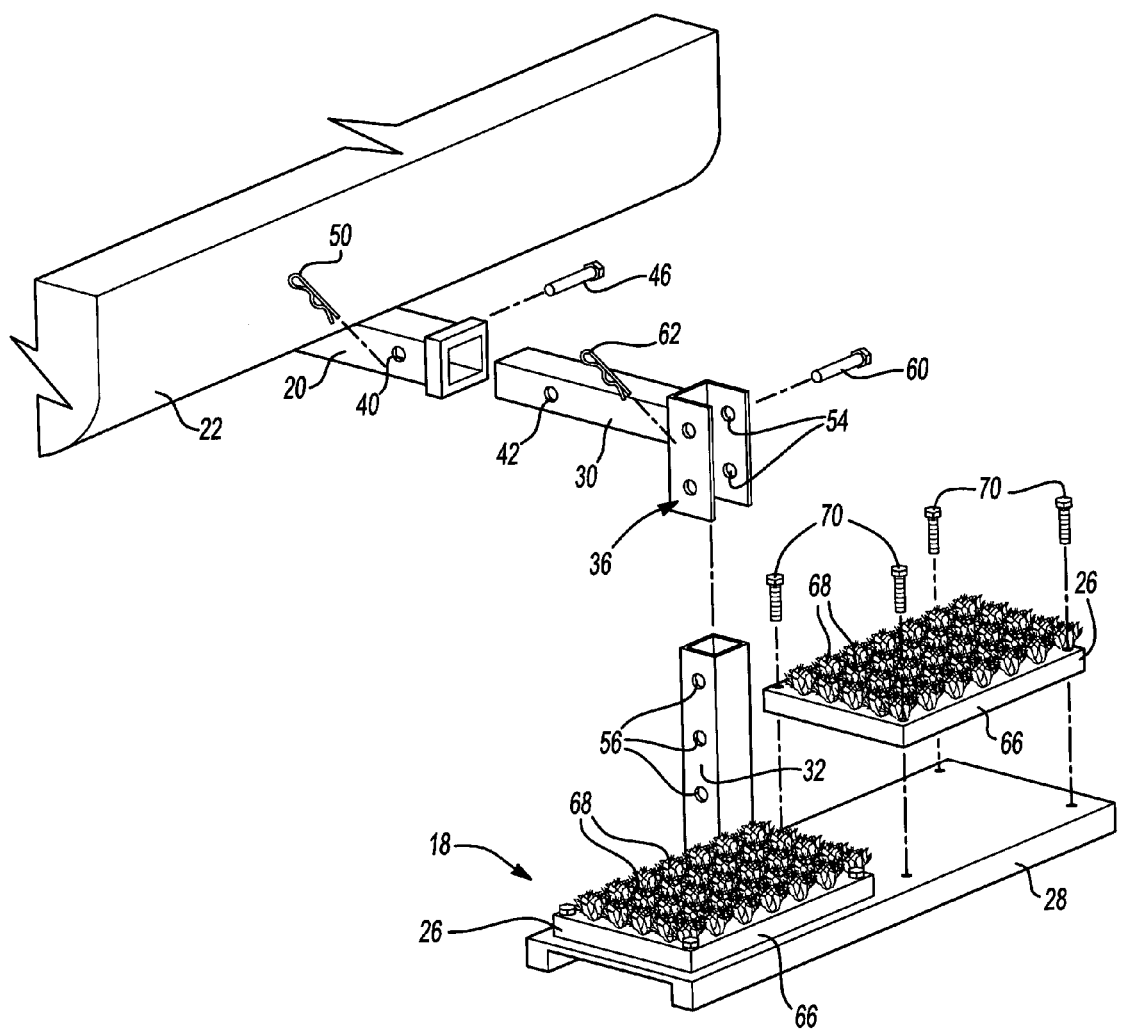
FIG. 2 is an exploded view of the tread cleaner of FIG. 1.

With initial reference to FIGS. 1 and 2, a tread cleaner according to the teachings of the present invention is shown and generally identified at reference 10. The tread cleaner 10 generally comprises a linkage 14 for selectively coupling a brush assembly 18 to a hitch receiver 20 on a vehicle 22. The brush assembly 18 includes at least one brush unit 26 mounted to a frame 28. The linkage 14 includes a hitch sleeve 30 adjustably coupled to a connector sleeve 32 extending from the frame 28 of the brush assembly 18.

The hitch sleeve 30 generally includes an insertion end 34 a receiving end 36. The insertion end 34 is adapted to be slidably inserted into the hitch receiver 20 of the vehicle 22. The hitch sleeve 30 comprises a substantially square cross-section having an outer dimension suitable to fit inside an inner dimension of the hitch receiver 20. It is appreciated that the insertion end 34 of the hitch sleeve 30 may comprise a variety of dimensions suitable to cooperate with a desired hitch receiver 20. A mounting aperture 40 is included on the hitch receiver 20 for aligning with a through-hole 42 formed on the hitch sleeve 30. A coupling element or hitch pin 46 extends through the mounting aperture 40 and through-hole 42 locking the hitch sleeve 30 in place. A cotter pin 50 prevents the hitch pin 46 from sliding out of the mounting aperture 40.

Figure 3:
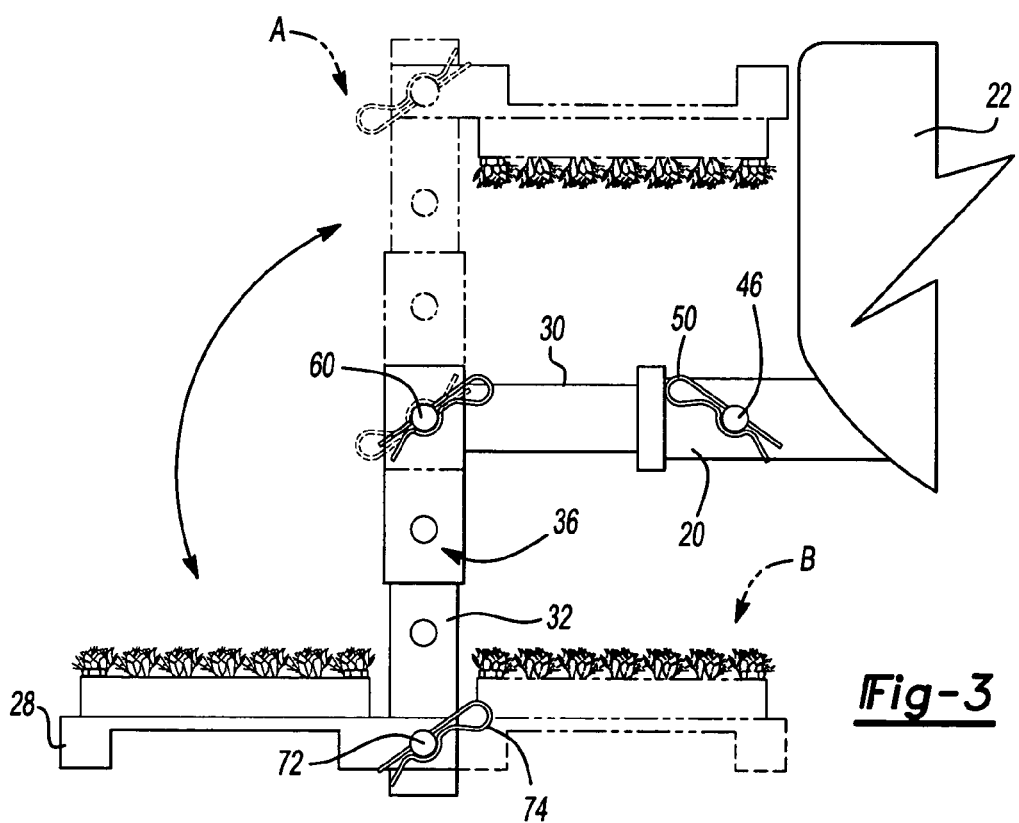
FIG. 3 is a side view of the tread cleaner of FIG. 1 shown with available storage positions in phantom.

With continued reference to FIGS. 1 and 2 and further reference to FIG. 3, the adjustability of the linkage will be described in greater detail. The receiving end 36 of the hitch sleeve 30 comprises a u-channel extending generally perpendicularly to a mounting axis defined by the hitch receiver 20. The u-channel includes a pair of mounting apertures 54 formed thereon for aligning with one of a plurality of through-holes 56 formed on the connector sleeve 32. In this way, the brush assembly 18 may be adjusted to a desired lateral offset with respect to the hitch receiver 20. As such, a user can locate the brush assembly 18 in a preferred height for accessibility during a tread cleaning event. Similarly, the brush assembly 18 may be adjusted to a desired location in a storage position A, B (FIG. 3) while not in use for ground clearance and/or convenience while the vehicle 22 is moving. For example, the connector sleeve 32 may be rotated 180 degrees clockwise (As viewed from FIG. 3) to have the brush assembly 18 assume a position above the hitch receiver 20 (position A). Alternatively, the connector sleeve 32 may be rotated about its axis 180 degrees to assume position B. A dowel pin 60 extends through the desired mounting aperture 54 and through-hole 56 locking the connector sleeve 32 in place. A cotter pin 62 secures the dowel pin 60 in place. Skilled artisans will appreciate that other mechanical configurations may be employed to achieve adjustability between the hitch sleeve 30 and the connector sleeve 32. For example, more or less mounting apertures 54 may be provided on the hitch sleeve 30. Likewise a different amount of through-holes 56 may be provided on the connector sleeve 32.

The brush assembly 18 will now be described in greater detail. The frame 28 is comprised of rigid material such as aluminum, steel or hard plastic for example. The brush units 26 each include a rigid support 66 having a plurality of bristles 68 extending outwardly therefrom. Fasteners 70 couple the brush units 26 to the frame 28 (FIG. 2). A dowel pin 72 and cotter pin 74 arrangement selectively fastens the frame 28 of the brush assembly 18 to the connector sleeve 32 of the linkage 14 (FIG. 3). In this regard, the brush unit 26 may be removed from the linkage 14 and stored inside the vehicle 22 or alternatively be used elsewhere without interrupting the locked relationship of the hitch receiver 20 and the linkage 14. For example, the frame 28 may be removed from the connector sleeve 32 by removing the cotter pin 74 and sliding out the dowel pin 72. The brush assembly 18 then may be placed on the ground for use in any desired location. In operation, a user may place one foot on a first brush unit 26 while swiping the other foot on the adjacent brush unit 26 to maintain balance.

Figure 4:
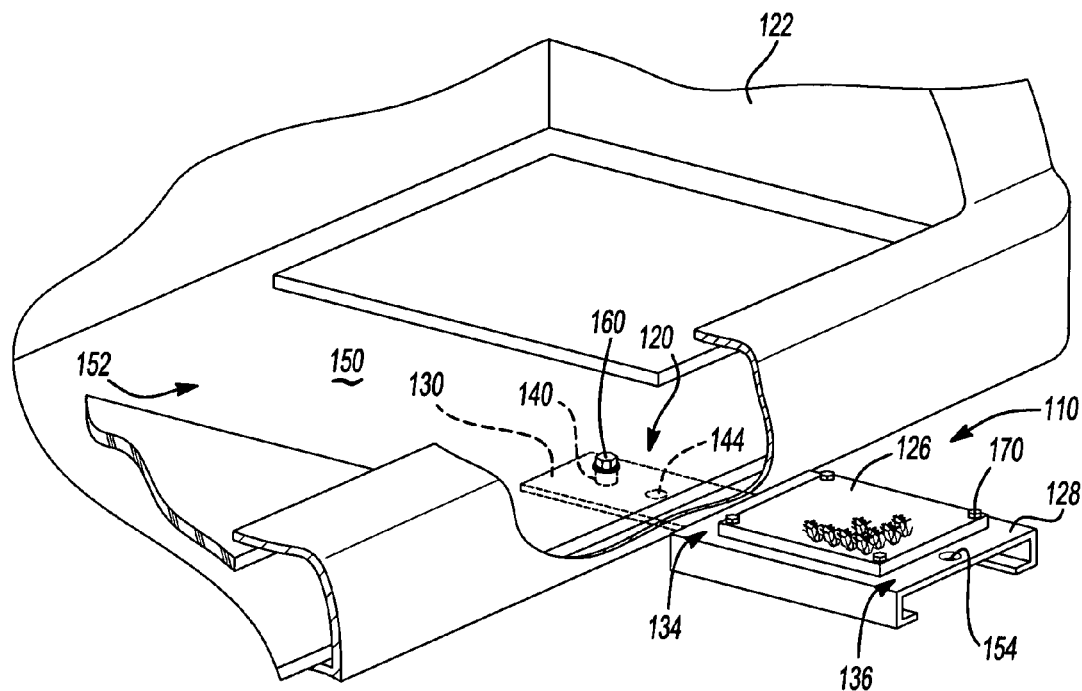
FIG. 4 is a perspective view of the tread cleaner according to a second embodiment shown assembled to a hitch receiver of an alternate vehicle.
Figure 5:
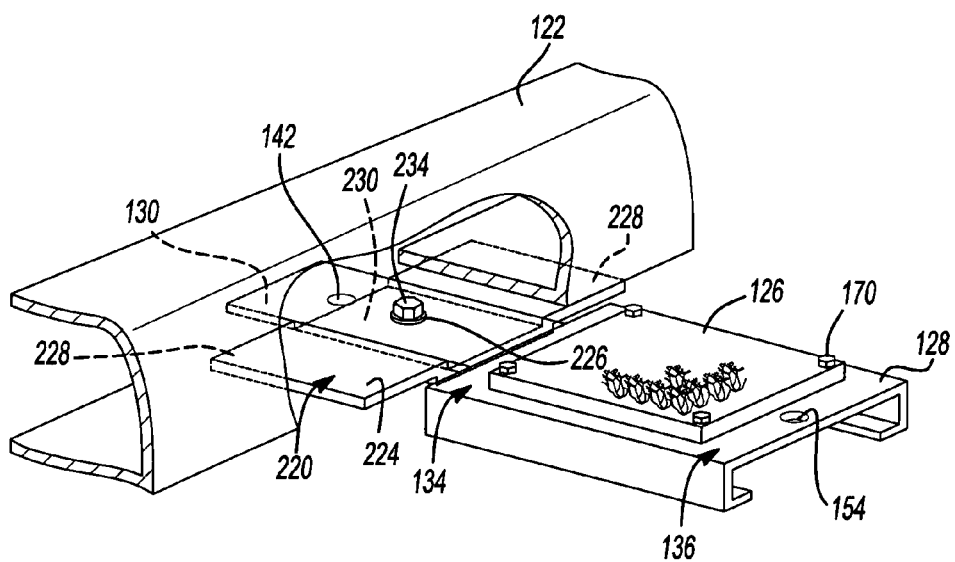
FIG. 5 is a perspective view of the tread cleaner of FIG. 4 shown assembled to an alternate hitch receiver.

With reference now to FIGS. 4 and 5, a tread cleaner 110 according to a second embodiment will be described. The tread cleaner 110 is configured to cooperate with a hitch receiver 120 of a vehicle such as a golf cart 122. The tread cleaner 110 includes a frame 128 having a mounting arm 130 arranged on a forward end 134. The mounting arm 130 is preferably a continuous extension of the frame 128 made of the same material. It is appreciated however, that the mounting arm may be a distinct component from the frame 128 and connected by way of a fastener.

Figure 7:
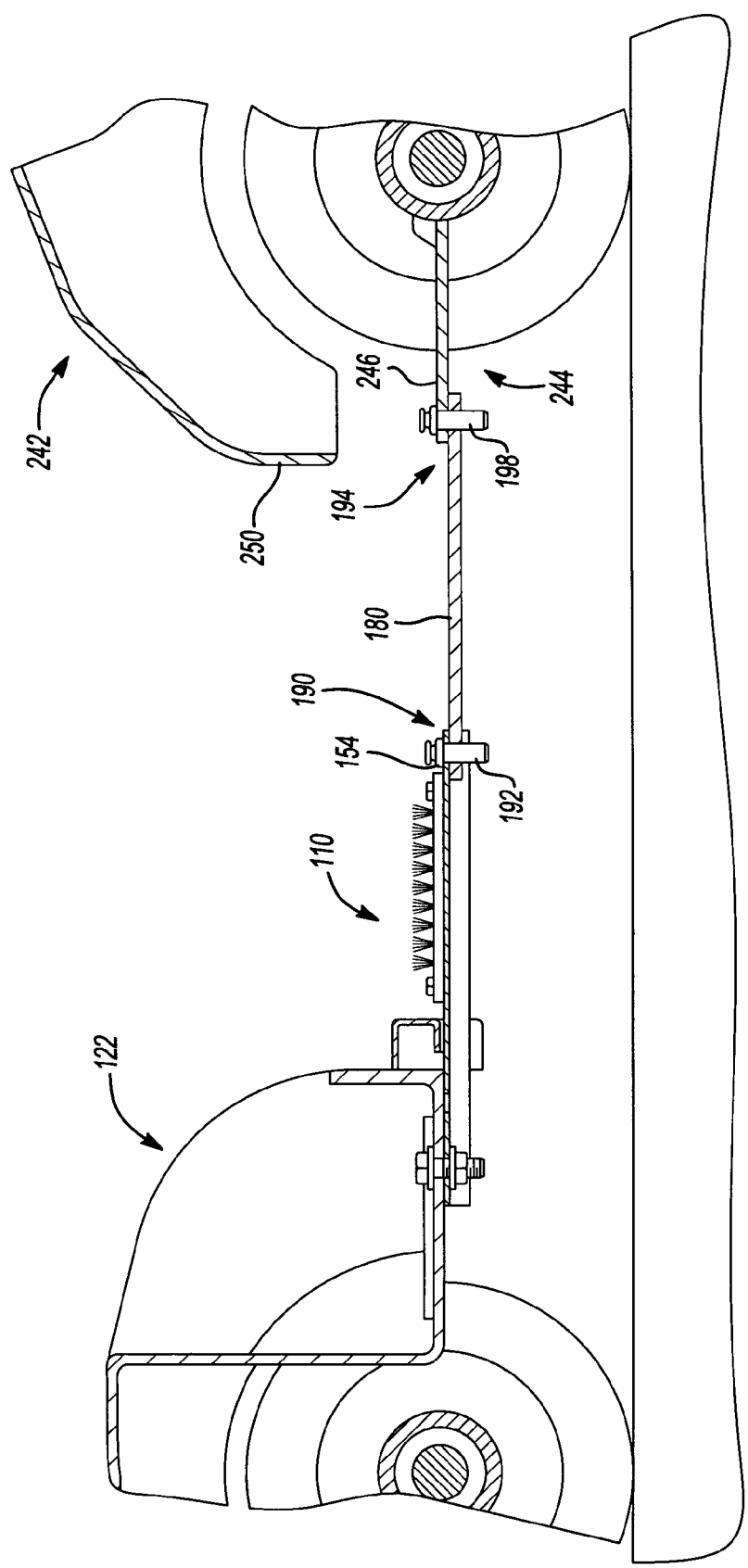
FIG. 7 is a side view of the tread cleaner of FIG. 4 shown with a link arm coupled to a second vehicle.

The mounting arm 130 includes a first and second mounting aperture 142, 144 formed thereon for accommodating two distinct golf cart mounting arrangements as will be described. A rearward end 136 includes a linking aperture 154 for accommodating a link bar 180 when towing a second golf cart 242 (FIG. 7). A brush unit 126 is coupled to the frame 128 by fasteners 170.

Mounting the tread cleaner 110 to a hitch receiver will now be described with reference to the mounting arrangement of FIG. 4. In the mounting arrangement of FIG. 4, the hitch receiver 120 comprises an aperture 140 arranged in the floor 150 of the bag storage area 152 of the cart 122. During assembly, the arm 130 is positioned below the floor 150 of the cart 122. The first mounting aperture 142 (best viewed in FIG. 5) of the arm 130 is aligned with the aperture 140 of the hitch receiver 120. A fastener 160 is then inserted through the mounting aperture 142 and the aperture 140 of the hitch receiver 120 and tightened to a secure fit.

With reference to FIG. 5, the hitch receiver 220 will be described according to a second mounting arrangement. The hitch receiver 220 as shown in FIG. 5 includes a bracket 224 having an aperture 226 formed thereon. The bracket 224 generally includes outer flanges 228 and a stepped down central portion 230. During assembly, the second mounting aperture 144 (best viewed in FIG. 4) of the arm 130 is aligned with the aperture 226 of the hitch receiver 220. While it is shown that the arm 130 is inserted above the stepped down central portion 230, the arm 130 may alternatively mate with the bottom surface of the hitch receiver 220. Next, a fastener 234 is inserted through the second mounting aperture 144 and the aperture 226 of the hitch receiver 220 and tightened to a secure fit.

Figure 6:
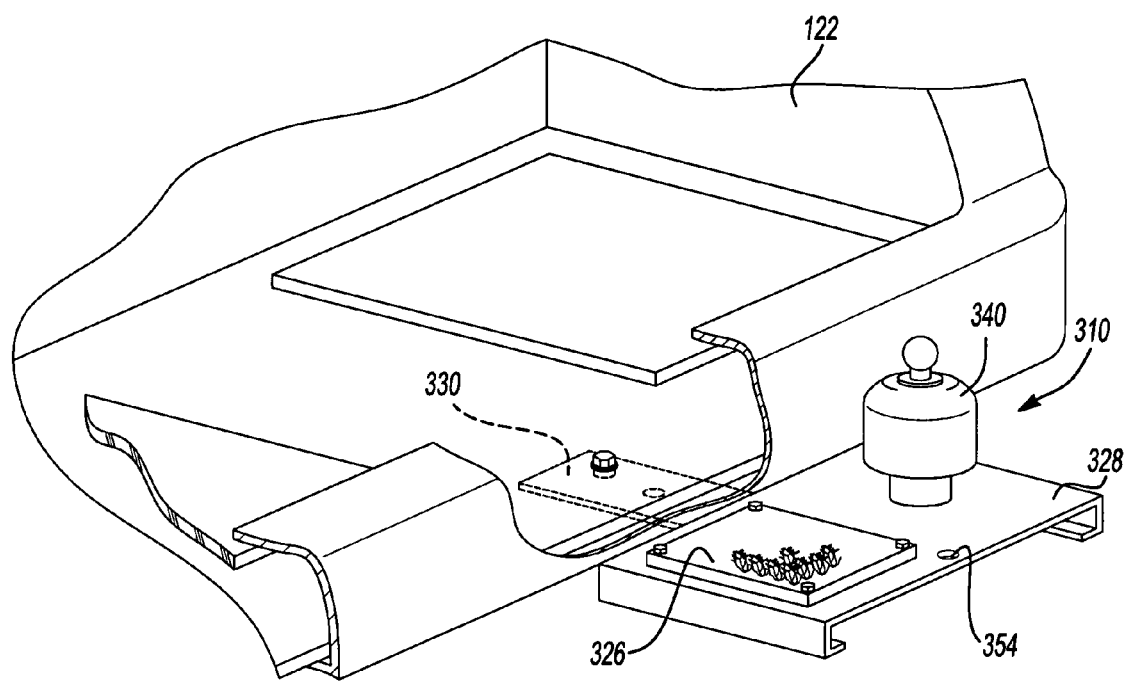
FIG. 6 is a perspective view of the tread cleaner of FIG. 4 according to an alternate embodiment.

Turning now to FIG. 6, a brush assembly 310 according to an alternate embodiment is shown wherein like reference numbers increased by 300 are used to designate like components. The brush assembly 310 includes a brush unit 326, a mounting arm 330, a linking aperture 354 and a ball washer device 340 coupled thereto. It is contemplated that other accessories may be secured to frame 328 of the brush assembly 310 in place of the brush unit 326 and/or ball washer 340 such as a seed container for divot repair for example.

With reference to FIG. 7, a tread cleaner 110 cooperating with a link bar 180 is shown towing a second golf cart 242. Specifically, a forward end 190 of the tow bar 180 is coupled to the tread cleaner 110 at the linking aperture 154 by way of a coupling member 192. Preferably, the coupling member 192 will allow relative rotational movement of the tread cleaner 110 and the tow bar 180 such that the first and second golf cart 122, 242 may turn relative to each other. A rearward end 194 of the tow bar 180 is coupled to the front end 244 of the second golf cart 242 by way of a coupling member 198. As shown, a front end linking bracket 246 extends from the forward end 244 of the second golf cart 242. It is contemplated however that the tow bar 180 may be coupled to alternative mounting areas on the front end 244 of the second cart 242 such as a front bumper 250 for example.

Figure 8:
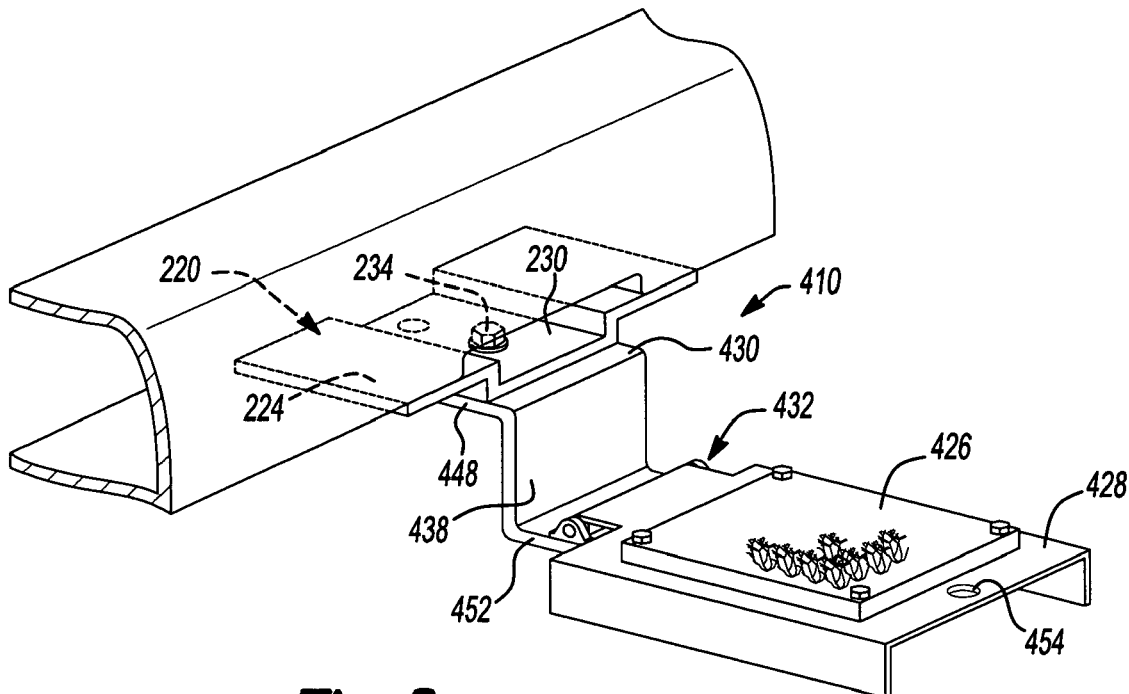
FIG. 8 is a perspective view of a tread cleaner according to a third embodiment shown in an operating position.
Figure 9:
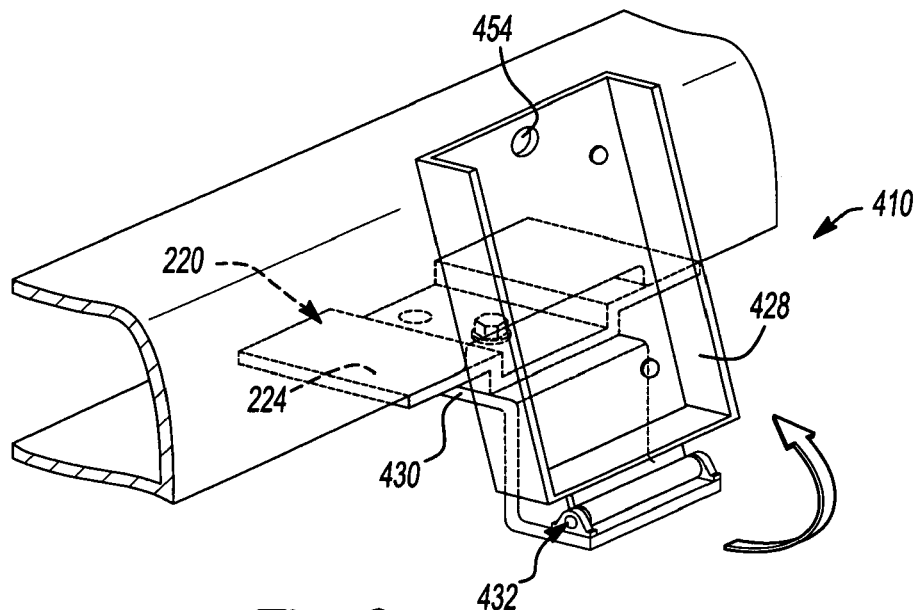
FIG. 9 is a perspective view of the tread cleaner of FIG. 8 shown in a storage position.

Turning now to FIGS. 8 and 9, a tread cleaner 410 according to a third embodiment is shown. The tread cleaner 410 incorporates a hinge 432 disposed thereon for moving the frame 428 and the brush unit 426 between an operating position and a storage position. The tread cleaner 410 incorporates like components as shown with respect to the tread cleaner 110 of FIGS. 4 and 5 and are designated with a 400 prefix. The tread cleaner 410 is shown coupled to the bracket 224 of the hitch receiver 220. The mounting arm 430 mounts to the bottom of the stepped down portion 230 by way of the fastener 234. As described herein, the mounting arm 430 may mount above or below the stepped down central portion 230.

The mounting arm 430 includes a stepped portion 438 for presenting the frame 428 and the brush unit 426 in a position closer to the ground allowing convenient user access in the operating position (FIG. 8). The stepped portion 438 extends substantially perpendicularly between an upper portion and a lower portion 448 and 452. The upper and lower portion extend substantially parallel to each other. A linking aperture 454 is formed on a rearward end of the frame 428 for cooperating with a tow bar in a towing position for towing a second vehicle.

As shown in FIG. 9, the tread cleaner 410 is shown rotated into the storage position. To move the tread cleaner 410 from the operating position to the storage position, the frame 428 is rotated counterclockwise as viewed from FIG. 9 about the hinge 432. Although the hinge 432 is shown as a collar and axis arrangement, other hinge mechanisms may be employed. The hinge 432 is positioned on the mounting arm 430 a laterally offset distance from the hitch receiver 220 to allow the frame 428 to occupy a beyond vertical orientation in the storage position.

Those skilled in the art can now appreciate from the foregoing description that the broad teachings of the present invention can be implemented in a variety of forms. For example, the dowel pins described herein may be replaced by other fasteners such as bolts. Therefore, while this invention has been described in connection with particular examples thereof, the true scope of the invention should not be so limited since other modifications will become apparent to the skilled practitioner upon a study of the drawings, the specification and the following claims.

What is claimed is:

1. A shoe cleaning apparatus selectively attachable to a rear of a vehicle comprising:
    a hitch receiver disposed entirely on an underside of a bumper on the rear of the vehicle, said hitch receiver defining an aperture;
    an integrally formed mounting arm including a lower portion comprising a lower horizontal member, a stepped portion and an upper portion comprising an upper horizontal member;
    at least one brush unit coupled to said mounting arm, said brush unit having a frame including a linking aperture formed thereon, said linking aperture arranged outboard of said brush unit and adapted to cooperate with a tow bar in a towing position for towing a second vehicle;
    a coupling element coupling said mounting arm to said hitch receiver of the vehicle such that said upper portion of said mounting arm mounts to said hitch receiver such that the entire shoe cleaning apparatus locates entirely under said bumper; and
    a hinge disposed on said mounting arm for moving said brush unit between an operating position and a storage position.

2. The shoe cleaning apparatus of claim 1 wherein said mounting arm includes at least one mounting aperture formed thereon for aligning with an aperture formed on said hitch receiver of the vehicle.

3. The shoe cleaning apparatus of claim 2 wherein said coupling element extends through said hitch receiver aperture and said mounting aperture in an installed position.

4. The show cleaning apparatus of claim 1 wherein said mounting arm includes a stepped portion for presenting said brush unit in a laterally offset relationship from the hitch receiver of the vehicle.

5. A shoe cleaning apparatus selectively attachable to a rear of a vehicle comprising:
    a hitch receiver disposed on an underside of a bumper on the rear of the vehicle, said hitch receiver defining an aperture;
    an integrally formed mounting arm having a lower portion comprising a lower horizontal member, a stepped portion and an upper portion comprising an upper horizontal member, said upper portion including at least one mounting aperture formed thereon for aligning with said aperture formed on said hitch receiver of the vehicle, said lower portion defining a lower plane and extending substantially parallel to an upper plane defined by said upper portion;
    at least one brush unit coupled to said mounting arm;
    a coupling element coupling said mounting arm to the hitch receiver of the vehicle such that said upper portion of said mounting arm locates entirely under said bumper, said coupling element extending through said hitch receiver aperture and said mounting aperture in an installed position;
    a linking aperture formed on a rearward end of said lower portion, said linking aperture adapted to cooperate with a tow bar in a towing position for towing a second vehicle; and
    a hinge disposed on said lower plane of said lower portion of said mounting arm for moving said brush unit between an operating position and a storage position.

* * * * *